US012574406B2

(12) United States Patent
Shi

(10) Patent No.: US 12,574,406 B2
(45) Date of Patent: Mar. 10, 2026

---

(54) SYSTEM AND METHOD FOR DATA FILTERING IN MACHINE LEARNING MODEL TO DETECT IMPERSONATION ATTACKS

(71) Applicant: Barracuda Networks, Inc., San Jose, CA (US)

(72) Inventor: Fleming Shi, Scotts Valley, CA (US)

(73) Assignee: Barracuda Networks, Inc., Campbell, CA (US)

( * ) Notice: Subject to any disclaimer, the term of this patent is extended or adjusted under 35 U.S.C. 154(b) by 407 days.

(21) Appl. No.: 17/247,356

(22) Filed: Dec. 8, 2020

(65) Prior Publication Data

US 2022/0141252 A1 May 5, 2022

Related U.S. Application Data

(60) Provisional application No. 63/108,827, filed on Nov. 2, 2020.

(51) Int. Cl.
H04L 9/40 (2022.01)
G06F 18/214 (2023.01)
G06N 20/00 (2019.01)

(52) U.S. Cl.
CPC ...... H04L 63/1466 (2013.01); G06F 18/2148 (2023.01); G06N 20/00 (2019.01); H04L 63/102 (2013.01); H04L 63/1416 (2013.01)

(58) Field of Classification Search
CPC ............... H04L 63/1466; H04L 63/102; H04L 63/1416; G06F 18/2148; G06N 20/00
See application file for complete search history.

(56) References Cited

U.S. PATENT DOCUMENTS

| | | | | |
|---|---|---|---|---|
| 10,916,351 | B1 * | 2/2021 | Oh ........................ | G06N 3/0985 |
| 11,194,552 | B1 * | 12/2021 | Echeverria ............... | G06N 5/04 |
| 2010/0205665 | A1 * | 8/2010 | Komili ................... | H04L 67/564 |
| | | | | 726/12 |
| 2016/0014151 | A1 * | 1/2016 | Prakash .................. | H04L 47/62 |
| | | | | 726/22 |
| 2016/0055132 | A1 * | 2/2016 | Garrison ............... | G06F 16/958 |
| | | | | 706/12 |
| 2017/0024363 | A1 * | 1/2017 | Tocchini .................. | G06N 7/01 |
| 2019/0026280 | A1 * | 1/2019 | Aviyam ................ | G06F 16/958 |
| 2019/0109863 | A1 * | 4/2019 | Traore ................ | H04L 63/1483 |
| 2020/0137110 | A1 * | 4/2020 | Tyler ................... | H04L 63/1483 |
| 2020/0396258 | A1 * | 12/2020 | Jeyakumar ............. | G06N 3/098 |
| 2021/0092132 | A1 * | 3/2021 | Bhatia ................. | H04L 63/1416 |

* cited by examiner

*Primary Examiner* — Farid Homayounmehr
*Assistant Examiner* — Mudasiru K Olaegbe

(57) ABSTRACT

A new approach is proposed to support data filtering in machine learning (ML) to detect impersonation attacks. First, filters are applied to filter data or information collected from a user in order to extract features that are specific and/or unique for the identification of the user. The features extracted from the set of data are then used to train ML models configured to identify a set of key characteristics of electronic messages or web-based resources originated by the user. When a new electronic message or web-based resource purported to be from the user is intercepted, one or more of the trained ML models that are applicable are utilized to determine or predict if the newly intercepted electronic message or web-based resource is indeed originated by the user or is impersonated by an attacker under the same filtering criteria as training of the corresponding ML models.

28 Claims, 2 Drawing Sheets

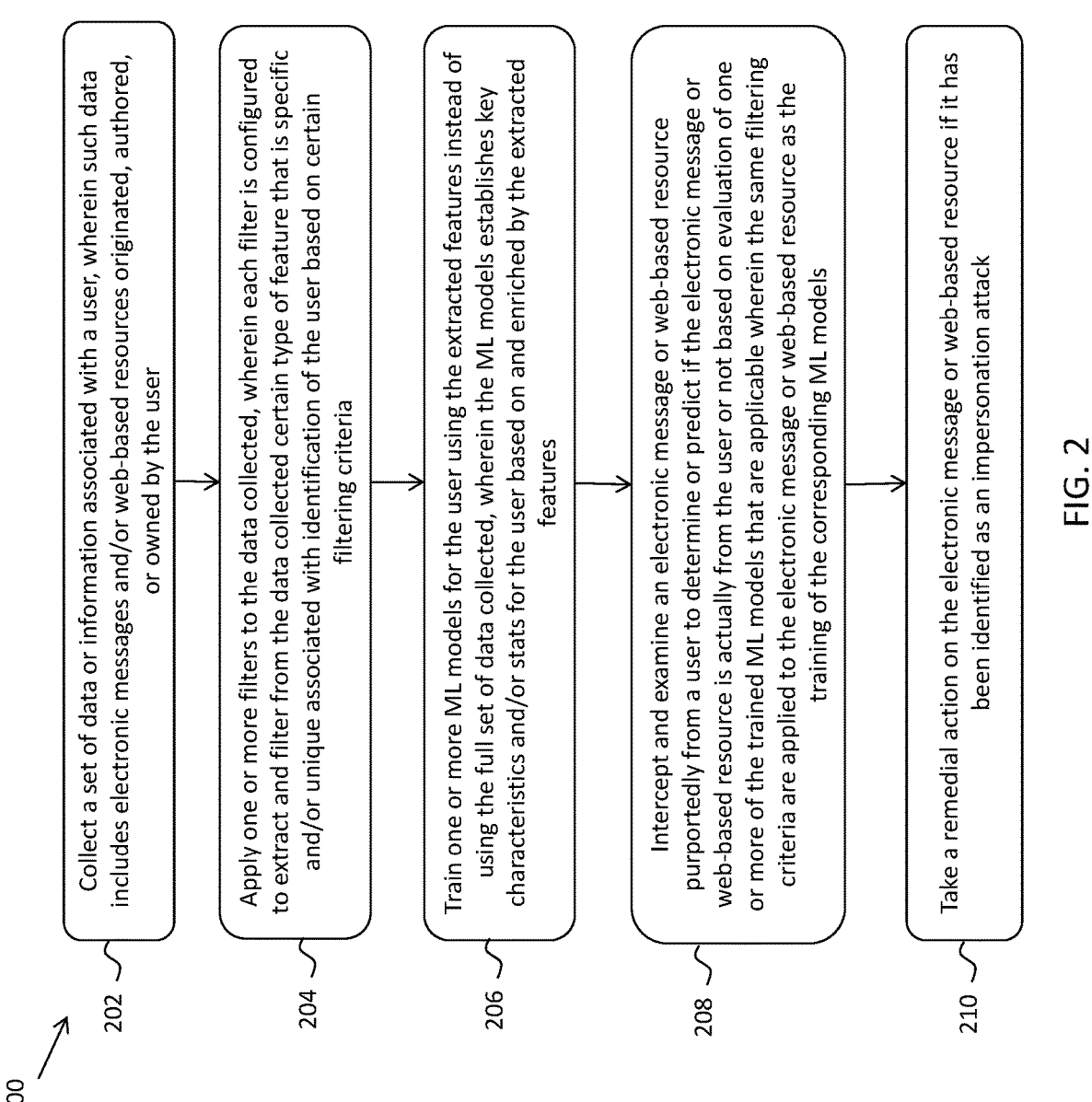

200

202 — Collect a set of data or information associated with a user, wherein such data includes electronic messages and/or web-based resources originated, authored, or owned by the user 204 — Apply one or more filters to the data collected, wherein each filter is configured to extract and filter from the data collected certain type of feature that is specific and/or unique associated with identification of the user based on certain filtering criteria 206 — Train one or more ML models for the user using the extracted features instead of using the full set of data collected, wherein the ML models establishes key characteristics and/or stats for the user based on and enriched by the extracted features 208 — Intercept and examine an electronic message or web-based resource purportedly from a user to determine or predict if the electronic message or web-based resource is actually from the user or not based on evaluation of one or more of the trained ML models that are applicable wherein the same filtering criteria are applied to the electronic message or web-based resource as the training of the corresponding ML models 210 — Take a remedial action on the electronic message or web-based resource if it has been identified as an impersonation attack

FIG. 2

SYSTEM AND METHOD FOR DATA FILTERING IN MACHINE LEARNING MODEL TO DETECT IMPERSONATION ATTACKS

CROSS-REFERENCE TO RELATED APPLICATIONS

This application claims the benefit of U.S. Provisional Patent Application No. 63/108,827, filed Nov. 2, 2020, which is incorporated herein in its entirety by reference.

BACKGROUND

With the exponential growth of Internet/IP/web traffic, cyber criminals are increasingly utilizing social engineering and deception to successfully conduct wire fraud and extract sensitive information from their targets via content impersonation and spoofing. Impersonation (or spoofing or spear phishing) attacks happen when an attacker sends emails that attempt to impersonate (on behalf of) a trusted individual or directs users to a website or content on the Internet that pretend to belong to a trusted entity or company in an attempt to gain access to confidential and/or sensitive personal user credentials or corporate information. The impersonated email or web-based content is a lookalike, or visually similar, to a targeted email, domain, user, or brand. Note that such impersonation attacks do not always have to impersonate individuals, they can also impersonate a system or component that can send or receive electronic messages or host a website or a web-based resource or service that users may access. For a non-limiting example, a networked printer on a company's internal network can be used by the so-called printer repo scam to initiate impersonation attacks against individuals of the company. For another non-limiting example, a fake website that users may be redirected to (e.g., by clicking on a link embedded in an email) may have the look and feel that is virtually identical to a legitimate website, where the users may then be directed to enter confidential information at the fake website. Such confidential information may subsequently be used by the attacker to access the users' various accounts, including e-mail accounts and financial accounts.

Currently, artificial intelligence (AI) or machine learning (ML) models are being used to detect impersonation attacks. In some approaches, historical or hypothetical emails or electronic communications to and/from a group of individuals are collected and utilized to train the ML models. After being trained with the data, the ML models are used to detect attacks launched by attackers impersonating the group of individuals. Due to the huge amount of raw data constantly being collected and used to train the ML models, the ML model training process is increasingly time consuming. Additionally, given the huge amount of data, it is hard to train the ML models on which aspects or features are important in terms of detecting the key differences between an authentic electronic communication from impersonated one by attackers. For example, it is hard for a ML model to recognize the difference between two emails purportedly sent by John Doe, one authentic and one impersonated, if both email addresses and the display names of the sender are identical.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 depicts a flowchart of an example of a process to support data filtering in machine learning to detect impersonation attacks in accordance with some embodiments.

DETAILED DESCRIPTION OF EMBODIMENTS

Figure 1:
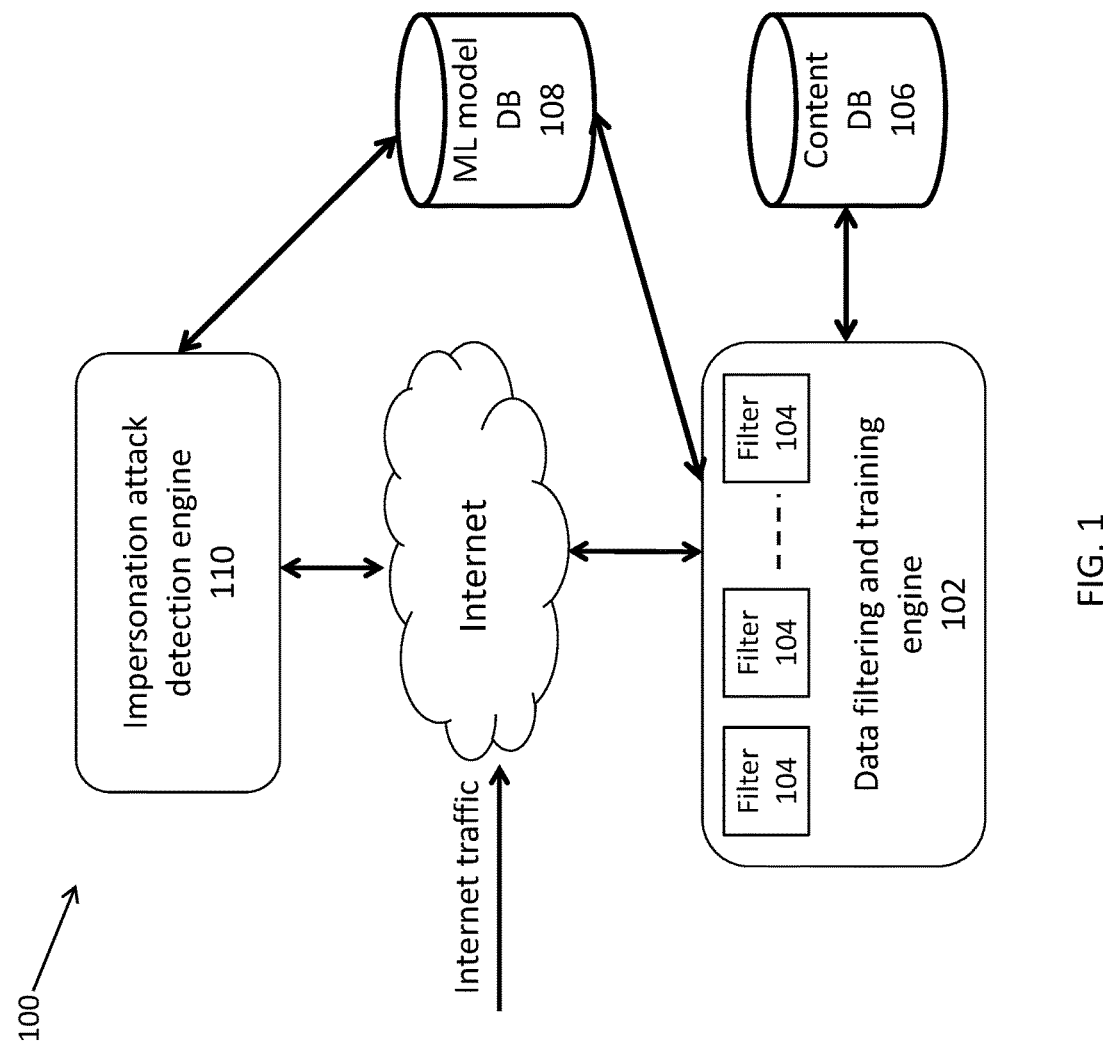
FIG. 1 depicts an example of a system diagram to support data filtering in machine learning to detect impersonation attacks in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support data filtering in machine learning (ML) to detect impersonation attacks. First, one or more filters are applied to filter a set of data or information collected from a user in order to extract one or more features that are specific and/or unique for the identification of the user. The one or more features extracted from the set of data are then used to train one or more ML models configured to identify a set of key characteristics of the electronic messages and/or web-based resources originated by the user. When a new electronic message and/or web-based resource purported to be from the user is intercepted or discovered, one or more of the trained ML models that are applicable are utilized to determine or predict if the newly intercepted electronic message or web-based resource is indeed originated by the user or is impersonated by an attacker under the same filtering criteria as training of the corresponding ML models.

By training the ML models using filtered features specific for the identification of the user instead of using the entire set of collected raw data, the proposed approach is configured to capture and highlight key characteristics of the electronic message and/or web-based resources of the user which may not obvious and may otherwise get lost in the huge amount of data collected. Based on such key characteristics that enriches the captured data associated with the user, the proposed approach is able to improve the efficacy of the ML models for impersonation attack detection. Any potential impersonation attack launched by the hackers can be detected and prevented based on their actual abnormalities with high accuracy and any fake or spoofed website or web-based resources can be identified efficiently. Here, the same data filtering criteria and/or filters can be used in both ML model training and impersonation attack prediction (determination and inference). Without the filtered features from the collected data, the detection of the potential impersonation attacks would otherwise be very difficult if not impossible given the overwhelming amount of data collected.

Note that the data filtering approach as discussed hereinafter is applied during the ML model training phase and attack prediction phase of machine learning as non-limiting examples. The same and similar approach can also be applied to other phases of machine learning. For a non-limiting example, data filtering can be used for hyperparameter tuning where features failed for identifying attacks are collected to automatically adjust/tune weights or parameters of the ML models so that the ML models are re-trained for better attack prediction.

As used hereinafter, the term "data" (or "collected data") refers to text, image, video, audio, or other any other type of content that is collected in the form of electronic communications and/or messages including but not limited to emails, instant messages, short messages, text messages, phone call transcripts, and social media posts. The collected data further includes identified web-based resources including but not limited to websites, web services, web-based content, cloud-based documents, and other types of contents or resources accessible over the Internet. In some embodiments, the collected data further includes metadata related to the electronic messages and/or web-based resources collected, wherein such metadata includes but is not limited to network flow, packet trace, geo location of the IP addresses, user-agent identification and other system or user identifiable information associated with the electronic messages and/or web-based resources.

As used hereinafter, the term "user" (or "users") refers not only to a person or human being, but also to an organization, a group of organizations, a country, and even a continent that may send or receive an electronic message, own a web-based resource, or possess any content that may be subject to an impersonation attack.

FIG. 1 depicts an example of a system diagram 100 to support data filtering for AI model training to detect impersonation attacks. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes one or more of a data filtering and training engine 102, which further includes one or more filtering components or filters 104s, a content database 106, a ML model database 108, and an impersonation attack detection engine 110. These components in the system 100 each runs on one or more computing units/appliances/devices/hosts (not shown) each with software instructions stored in a storage unit such as a non-volatile memory (also referred to as secondary memory) of the computing unit for practicing one or more processes. When the software instructions are executed, at least a subset of the software instructions is loaded into memory (also referred to as primary memory) by one of the computing units, which becomes a special purposed one for practicing the processes. The processes may also be at least partially embodied in the computing units into which computer program code is loaded and/or executed, such that, the host becomes a special purpose computing unit for practicing the processes.

In the example of FIG. 1, each computing unit can be a computing device, a communication device, a storage device, or any computing device capable of running a software component. For non-limiting examples, a computing device can be but is not limited to a server machine, a laptop PC, a desktop PC, a tablet, a Google's Android device, an iPhone, an iPad, and a voice-controlled speaker or controller. Each computing unit has a communication interface (not shown), which enables the computing units to communicate with each other, the user, and other devices over one or more communication networks following certain communication protocols, such as TCP/IP, http, https, ftp, and sftp protocols. Here, the communication networks can be but are not limited to, Internet, intranet, wide area network (WAN), local area network (LAN), wireless network, Bluetooth, WiFi, and mobile communication network. The physical connections of the network and the communication protocols are well known to those of skilled in the art.

In the example of FIG. 1, the data filtering and training engine 102 is configured to collect a set of data or information associated with a user, wherein such data includes but is not limited to electronic messages and/or web-based resources such as websites originated, authored, or owned by the user. In some embodiments, the data is collected from a content database 106, which is configured to maintain archived electronic messages that have been audited and verified to be originated or authored by the user in the past. In some embodiments, the data is collected from electronic messages sent by the user in real time after such real time electronic messages have been verified or audited to be authored by the user. In some embodiments, the data is collected from website(s) or other types of web-based contents or resources that have been verified to be created, modified, owned by the user only without ever being tampered or hacked by a hacker. Here, such web-based resources are either currently or previously available on the Internet for public access at one point in time.

Note that in an impersonation attack, a hacker may send a look-alike electronic message that has the same or similar sender name, email address, title, or even content as an authentic electronic message sent from the actual user or create a website that has the same or similar style, color or content as the real one owned by the user. In the example of FIG. 1, the data filtering and training engine 102 further includes and applies one or more filtering components or filters 104s to the data collected, wherein each filter 104 is configured to extract and filter from the data collected certain type of feature that are specific and/or unique associated with the identification of the user based on certain filtering criteria. For a non-limiting example, in the case of the electronic messages, the filters 104s are configured to extract various features of the content of the electronic messages to ascertain the writing style of the user based on one or more of: punctuations, schematics, naming conventions, signature styles (first name, last name or abbreviations), etc. of the user. In some embodiments, the filters 104s are also configured to extract various features of the content from a website or a web-based content to ascertain that a s style of the website or content created and/or edited by the user based on one or more of: styles, colors, fonts, sitemap, layout of content, etc. of the web-based resources.

Once the features are filtered and extracted from the data collected from each user, the data filtering and training engine 102 is configured to train one or more machine learning (ML) models for the user using these extracted features instead of using the full set of collected data. For each user from whom the data is being collected, the ML models establishes key characteristics and/or stats for the user based on and enriched by the extracted features. In some embodiments, the characteristics and/or stats of the ML models for each user are maintained in the ML model database 108. For a non-limiting example, in the case of electronic messages, the ML models capture the user's unique writing styles and/or patterns including but not limited to how often the user uses certain types of punctuations such as exclamations and/or semi-colons, how the user addresses other people either internally or externally in the content, how the user signs at the conclusions of the electronic messages. In the case of websites or other types of web-based resources, the ML models capture both the style and substance of the content in terms of the overall organization and sitemap of the web-based resources that are uniquely associated with the user. Since each user has his/her unique writing style as characterized by these key characteristics, which, unlike name, email address, title or even content, are hard for the hacker to imitate, these key characteristics can be used to distinguish actual electronic messages or web-based resources by the user from faked ones in an impersonation attack.

In the example of FIG. 1, the impersonation attack detection engine 110 is configured to intercept and/or monitor an electronic message or web-based resource purportedly from a user. The impersonation attack detection engine 110 is then configured to examine the content of the electronic message or web-based resource to determine or predict if the electronic message or web-based resource is actually from the user (and not impersonated by a hacker) based on the evaluation of applicable ML models maintained in the ML model database 108. Note that the final inference or determination does not require the application of all ML models that have been trained via the filtering data. In some embodiments, the impersonation attack detection engine 110 can optionally choose what ML model(s) is applicable based on content type and/or available features of the electronic message or web-based resource for performance optimization and accuracy. In some embodiments, when the impersonation attack detection engine 110 intercepts an electronic message appeared to be sent by, e.g., John Doe from his email address, the impersonation attack detection engine 110 is configured to process the electronic message or the web-based resource using the same filtering criteria and the filters 104s as used by the data filtering and training engine 102 to train the ML models. In some embodiments, the impersonation attack detection engine 110 is configured to iterate through one or more rounds of data filtering and apply each of the matching ML models to the intercepted electronic message or the web-based resource for a model-specific determination at each iteration. If one or more of the ML models predicts the electronic message to be suspicious during any round of data filtering, e.g., the intercepted electronic message uses different patterns or styles of signatures and/or punctuations from what are uniquely associated with the user, the impersonation attack detection engine 110 is configured to mark the electronic message as high risk and alert a system administrator accordingly, who may then check and confirm if the electronic message is part of an impersonation attack. Similarly, the impersonation attack detection engine 110 is configured to inspect a website or web-based resource purportedly owned by the user, extract key styles and content layouts from the website or web-based resource and compare that to the key characteristics of the authentic website or web-based resources owned by the user based on the ML models from the ML model database 108 to determine if the website or web-based resource is fake or not.

In some embodiments, the impersonation attack detection engine 110 is configured to take various remedial actions on the electronic message or web-based resource that has been identified as an impersonation attack. Such remedial actions include but are not limited to blocking, deleting, or quarantining the malicious electronic message or web-based resource. In some embodiments, the impersonation attack detection engine 110 is configured to continuously monitor and/or audit electronic messages and/or web-based resources originated from or located at the IP address from which the impersonation attack was previously launched and mark such electronic messages and/or web-based resources as high risks. In some embodiment, the impersonation attack detection engine 110 is configured to quarantine any electronic messages marked as high risk and to block or redirect any access request to the web-based resources marked as high risk if any malicious and/or evasive behavior is found.

FIG. 2 depicts a flowchart 200 of an example of a process to support data filtering for machine learning to detect impersonation attacks. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where a set of data or information associated with a user is collected, wherein such data includes electronic messages and/or web-based resources originated, authored, or owned by the user. The flowchart 200 continues to block 204, where one or more filters are applied to the data collected, wherein each filter is configured to extract and filter from the data collected certain type of feature that is specific and/or unique associated with identification of the user based on certain filtering criteria. The flowchart 200 continues to block 206, where one or more ML models are trained for the user using the extracted features instead of using the full set of data collected, wherein the ML models establishes key characteristics and/or stats for the user based on and enriched by the extracted features. The flowchart 200 continues to block 208, where an electronic message or web-based resource purportedly from a user is intercepted and examined to determine or predict if the electronic message or web-based resource is actually from the user or not based on evaluation of one or more of the trained ML models that are applicable wherein the same filtering criteria are applied to the electronic message or web-based resource as the training of the corresponding ML models. The flowchart 200 ends at block 210, where a remedial action is taken on the electronic message or web-based resource if it has been identified as an impersonation attack.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system to support data filtering in machine learning (ML), comprising:

a processor executing a data filtering and training engine configured to collect a first set of data associated with a first user and collect a second set of data associated with a second user, wherein the first and the second set of data includes electronic messages and/or web-based resources originated, authored, or owned by the first and the second users respectively, and wherein the collected first and the second set of data have been audited and verified to be originated or authored by the first and the second users respectively in the past;

apply a first and a second set of filters to the first set of data, wherein the first and the second set of filters include at least one or more of punctuations, schematics, naming conventions, and signature styles of the first user, and wherein the first set of filters and the second set of filters are configured to extract a first and a second subset of data from the first set of data, wherein at least one feature of the first subset of data from the first set of data is different from one feature of the second subset of data from the first set of data, wherein the first subset of data and the second subset of data from the first set of data is each specific and/or unique associated with identification of the first user;

apply a third and a fourth set of filters to the second set of data, wherein the third and the fourth set of filters include at least one or more of punctuations, schematics, naming conventions, and signature styles of the second user, and wherein the third set of filters and the fourth set of filters are configured to extract a first and a second subset of data from the second set of data, wherein at least one feature of the first subset of data from the second set of data is different from one feature of the second subset of data from the second set of data, wherein the second subset of data and the second subset of data from the second set of data is each specific and/or unique associated with identification of the second user;

train a first and a second ML model for the first user using the first subset of data of the first set of data and the second subset of data of the first set of data respectively instead of the first set of data, wherein the first and the second ML models for the first user establish key characteristics and/or stats for the first user based on and enriched by the extracted features;

train a first and a second ML model for the second user using the first subset of data of the second set of data and the second subset of data of the second set of data respectively instead of the second set of data, wherein the first and the second ML models for the second user establish key characteristics and/or stats for the second user based on and enriched by the extracted features, wherein a trained ML model for the second user is different from the first user;

the processor executing an impersonation attack detection engine configured to intercept and examine an electronic message or web-based resource purportedly from a user to determine or predict if the electronic message or web-based resource is actually from the first user or not, wherein the examination of the electronic message or the web-based resource is based on selection of the first ML model or the second ML model for the first user based on content type within the electronic message or web-based resource and subsequent to the selection of either the first ML model for the first user or the second ML model for the first user evaluation of the electronic message or the web-based resource;

take a remedial action on the electronic message or web-based resource if it has been identified as an impersonation cyber attack.

2. The system of claim 1, wherein:

each electronic message is one of an email, an instant message, a short message, a text message, a phone call transcript, and a social media post.

3. The system of claim 1, wherein:

each web-based resource is one of a website, a web service, a web-based content, a cloud-based document, and other type of content or resource accessible over the Internet.

4. The system of claim 1, wherein:

the first set of collect data includes metadata related to the electronic messages and/or web-based resources collected.

5. The system of claim 1, wherein:

the data filtering and training engine is configured to collect the first set of data from electronic messages sent by the first user in real time after such real time electronic messages have been verified or audited to be authored by the first user.

6. The system of claim 1, wherein:

the data filtering and training engine is configured to collect the web-based resources that have been verified to be created, modified, owned by the first user only without ever being tampered or hacked by a hacker, wherein such web-based resources are either currently or previously available on the Internet for public access at one point in time.

7. The system of claim 1, wherein:

the data filtering and training engine is configured to apply the first set and the second set of filters to extract one or more features of the content of the electronic messages to ascertain a writing style of the first user based on one or more of punctuations, schematics, naming conventions, and signature styles of the user.

8. The system of claim 1, wherein:
the data filtering and training engine is configured to apply the first set and the second set of filters to extract one or more features of content from the web-based resources to ascertain a style of the web-based resources created and/or edited by the first user based on one or more of styles, colors, fonts, sitemap, and layout of content of the web-based resources.

9. The system of claim 1, wherein:
the data filtering and training engine is configured to collect features failed for identifying the attacks to automatically adjust or tune weights or parameters of the first and the second ML models associated with the first user for hyper-parameter tuning so that the ML models are re-trained for attack prediction.

10. The system of claim 1, wherein:
the first and the second ML models associated with the first user capture the user's unique writing styles and/or patterns including one or more of how often the first user uses certain types of punctuations, how the first user addresses other people either internally or externally in the content, how the first user signs at the conclusions of the electronic messages.

11. The system of claim 1, wherein:
the first and the second ML models associated with the first user capture both the style and substance of the content in terms of the overall organization and sitemap of the web-based resources that are uniquely associated with the first user.

12. The system of claim 1, wherein:
the impersonation attack detection engine is configured to
apply each of the first or the second ML models associated with the first user to the intercepted electronic message or the web-based resource for a model-specific determination during one or more rounds of data filtering;
mark the intercepted electronic message or the web-based resource as high risk and alert a system administrator accordingly if the extracted features and those from the first or the second ML models associated with the first user do not match during a round of data filtering.

13. The system of claim 1, wherein:
the impersonation attack detection engine is configured to
inspect and extract key styles and content layouts from the website or web-based resource purportedly owned by the first user;
compare the extracted key styles and content layouts to the key characteristics of authentic web-based resources owned by the first user based on the first or the second ML models associated with the first user to determine if the web-based resource is fake or not.

14. The system of claim 1, wherein:
the impersonation attack detection engine is configured to
continuously monitor and/or audit electronic messages and/or web-based resources originated from or located at an IP address from which the impersonation attack was previously launched;
mark such electronic messages and/or web-based resources as high risks.

15. The system of claim 14, wherein:
the impersonation attack detection engine is configured to
quarantine any electronic messages marked as high risk;
block or redirect any access request to the web-based resources marked as high risk if any malicious and/or evasive behavior is found.

16. A method to support data filtering in machine learning (ML), comprising:
collecting a first set of data associated with a first user and collecting a second set of data associated with a second user, wherein the first and the second set of data includes electronic messages and/or web-based resources originated, authored, or owned by the first and the second users respectively, and wherein the collected first and the second set of data have been audited and verified to be originated or authored by the first and the second users respectively in the past;
applying a first and a second set of filters to the first set of data, wherein the first and the second set of filters include at least one or more of punctuations, schematics, naming conventions, and signature styles of the first user, and wherein the first set of filters and the second set of filters are configured to extract a first and a second subset of data from the first set of data, wherein at least one feature of the first subset of data from the first set of data is different from one feature of the second subset of data from the first set of data, wherein the first subset of data and the second subset of data from the first set of data is each specific and/or unique associated with identification of the first user;
applying a third and a fourth set of filters to the second set of data, wherein the third and the fourth set of filters include at least one or more of punctuations, schematics, naming conventions, and signature styles of the second user, and wherein the third set of filters and the fourth set of filters are configured to extract a first and a second subset of data from the second set of data, wherein at least one feature of the first subset of data from the second set of data is different from one feature of the second subset of data from the second set of data, wherein the second subset of data and the second subset of data from the second set of data is each specific and/or unique associated with identification of the second user;
training a first and a second ML model for the first user using first the first subset of data of the first set of data and the second subset of data of the first set of data respectively instead of the first set of data, wherein the first and the second ML models for the first user establish key characteristics and/or stats for the first user based on and enriched by the extracted features;
training a first and a second ML model for the second user using the first subset of data of the second set of data and the second subset of data of the second set of data respectively instead of the second set of data, wherein the first and the second ML models for the second user establish key characteristics and/or stats for the second user based on and enriched by the extracted features, wherein a trained ML model for the second user is different from the first user;
intercepting and examining an electronic message or web-based resource purportedly from a user to determine or predict if the electronic message or web-based resource is actually from the first user or not, wherein the examining of the electronic message or the web-based resource is based on selection of the first ML model or the second ML model for the first user based on content type within the electronic message or web-based resource and subsequent to the selection of either the first ML model or the second ML model for the first user evaluation of the electronic message or the web-based resource;

taking a remedial action on the electronic message or web-based resource if it has been identified as an impersonation attack.

17. The method of claim 16, further comprising:

collecting metadata related to the electronic messages and/or web-based resources.

18. The method of claim 16, further comprising:

collecting the first set of data from electronic messages sent by the first user in real time after such real time electronic messages have been verified or audited to be authored by the first user.

19. The method of claim 16, further comprising:

collecting the web-based resources that have been verified to be created, modified, owned by the first user only without ever being tampered or hacked by a hacker, wherein such web-based resources are either currently or previously available on the Internet for public access at one point in time.

20. The method of claim 16, further comprising:

applying the first set and the second set of filters to extract one or more features of the content of the electronic messages to ascertain a writing style of the first user based on one or more of punctuations, schematics, naming conventions, and signature styles of the first user.

21. The method of claim 16, further comprising:

applying the first set and the second set of filters to extract one or more features of content from the web-based resources to ascertain a style of the web-based resources created and/or edited by the first user based on one or more of styles, colors, fonts, sitemap, and layout of content of the web-based resources.

22. The method of claim 16, further comprising:

collecting features failed for identifying the attacks to automatically adjust or tune weights or parameters of the first and the second ML models associated with the first user for hyper-parameter tuning so that the first and the second ML models associated with the first user are re-trained for attack prediction.

23. The method of claim 16, further comprising:

capturing the user's unique writing styles and/or patterns including one or more of how often the first user uses certain types of punctuations, how the first user addresses other people either internally or externally in the content, how the first user signs at the conclusions of the electronic messages via the first and the second ML models for the first user.

24. The method of claim 16, further comprising:

capturing both the style and substance of the content in terms of the overall organization and sitemap of the web-based resources that are uniquely associated with the first user the first and the second ML models associated with the first user.

25. The method of claim 16, further comprising:

applying the first or the second ML models associated with the first user to the intercepted electronic message or the web-based resource for a model-specific determination during one or more rounds of data filtering;

marking the intercepted electronic message or the web-based resource as high risk and alert a system administrator accordingly if the extracted features and those from the first or the second ML models for the first user do not match during a round of data filtering.

26. The method of claim 16, further comprising:

inspecting and extracting key styles and content layouts from the website or web-based resource purportedly owned by the first user;

comparing the extracted key styles and content layouts to the key characteristics of authentic web-based resources owned by the first user based on the first or the second ML models associated with the first user to determine if the web-based resource is fake or not.

27. The method of claim 16, further comprising:

continuously monitoring and/or auditing electronic messages and/or web-based resources originated from or located at an IP address from which the impersonation attack was previously launched;

marking such electronic messages and/or web-based resources as high risks.

28. The method of claim 27, further comprising:

quarantining any electronic messages marked as high risk; blocking or redirecting any access request to the web-based resources marked as high risk if any malicious and/or evasive behavior is found.

\* \* \* \* \*